United States Patent [19]

Leva

[11] 4,327,043

[45] Apr. 27, 1982

[54] TOWER PACKING ELEMENT

[76] Inventor: Max Leva, 5600 Munhall Rd., Pittsburgh, Pa. 15217

[21] Appl. No.: 219,311

[22] Filed: Dec. 22, 1980

[51] Int. Cl.³ .................................................. B01F 3/04
[52] U.S. Cl. .......................................... 261/94; 55/90;
202/158; 261/DIG. 72
[58] Field of Search .................................... 261/94–98,
261/DIG. 72; 210/150, 151; 264/285; 202/158;
55/90

[56] References Cited

U.S. PATENT DOCUMENTS

| | | | |
|---|---|---|---|
| 912310 | 2/1909 | Guttmann | 261/94 |
| 1,796,501 | 3/1931 | Berl | 261/DIG. 72 |
| 2,602,651 | 7/1952 | Cannon | 261/DIG. 72 |
| 2,639,909 | 5/1953 | Leva | 261/DIG. 72 |
| 3,266,787 | 8/1966 | Eckert | 261/DIG. 72 |
| 4,203,934 | 5/1980 | Leva | 261/DIG. 72 |

FOREIGN PATENT DOCUMENTS

| | | | |
|---|---|---|---|
| 457966 | 3/1928 | Fed. Rep. of Germany | 261/94 |
| 1029346 | 5/1958 | Fed. Rep. of Germany | 261/94 |
| 2821186 | 11/1978 | Fed. Rep. of Germany | 261/DIG. 72 |
| 2845804 | 5/1979 | Fed. Rep. of Germany | 261/DIG. 72 |

*Primary Examiner*—Richard L. Chiesa
*Attorney, Agent, or Firm*—William J. Ruano

[57] ABSTRACT

A randomly packed bed in a tower or column to prevent nesting of the packing elements and to improve mass transfer efficiency and physical stability. Each packing element has an intermediate curved portion joined with end portions curved in an opposite direction from the intermediate portion. Slots and tongues are provided at least in the intermediate portion. The tongues extend from the concave surface of the intermediate portion and preferably extend beyond a line joining the extremities of said end portions. The intermediate and end portions may be either circular or non-circular. The end portions may be of different lengths. The packing element and sometimes the tongues may be perforated.

13 Claims, 16 Drawing Figures

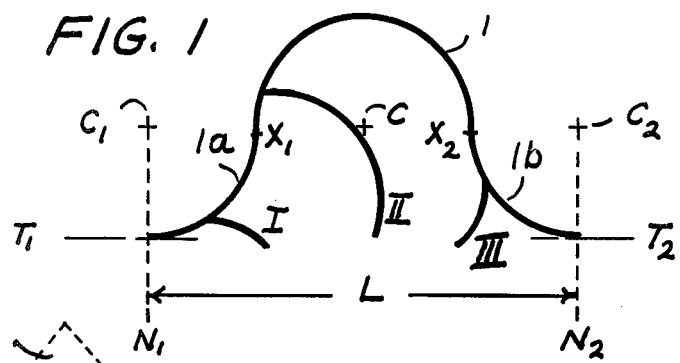
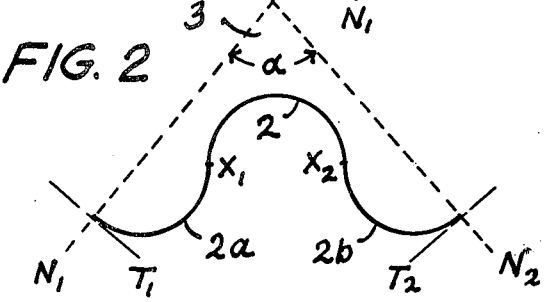
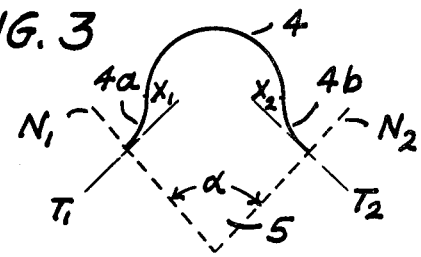
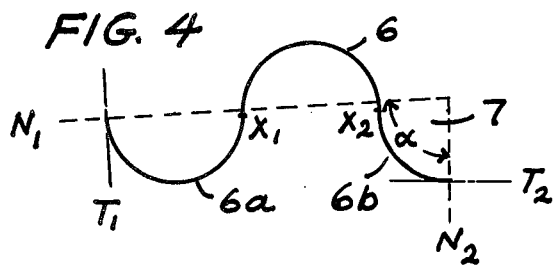
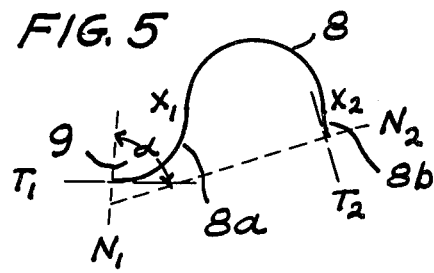
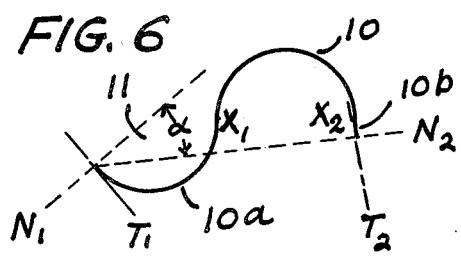
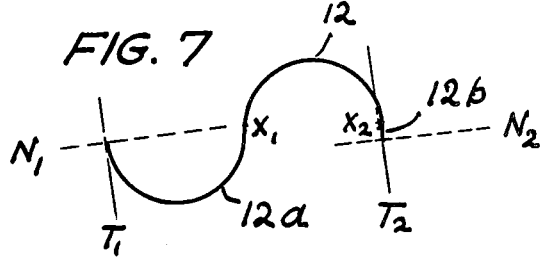
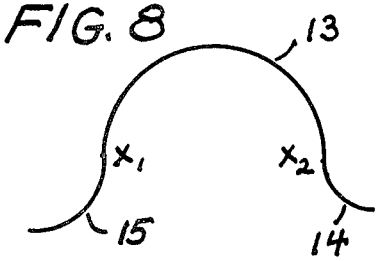
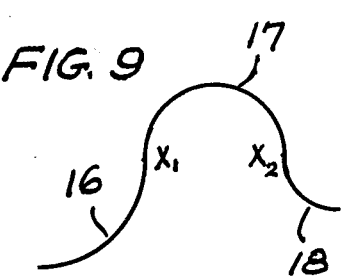
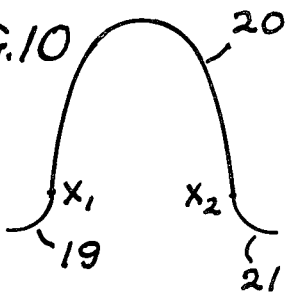

TOWER PACKING ELEMENT

This invention relates to a new tower packing element which is used in randomly poured beds contained in towers, to bring about mass transfer between gaseous or vaporous and liquid phases.

BACKGROUND OF THE INVENTION

In most cases, the randomly poured bed or packing is employed in vertical vessels with the gas or vapor phase entering the packed bed from the bottom of the packed bed and rising upwardly. The liquid is administered to the top of the packed bed, usually by means of a liquid distributor, and through the force of gravity runs downwardly.

It is the function of the packing to provide a framework or open celled structure in the tower over the surface of which it is endeavored to pass the liquid in the form of a thin film, whereas the gas or vapor is rising upwardly through the interstices of this structure. With the liquid thus finely divided and offering much surface area, mass transfer is occurring between the gas or vapor and liquid phases, respectively.

With this mechanism being operative in the packed bed, it is readily conceived that the rate of mass transfer per unit volume of packed bed, hence the efficiency of the packed bed to bring about mass transfer, is for given systems and concentrations dependent, to an important extent, upon the surface area which the packing can provide.

Whereas it is not a particularly difficult problem to propose a shape of tower packing element, which, when poured into a vessel, will generate a packed bed of an unusually large surface area, this situation is by itself not sufficient to assure a high rate of mass transfer. Rather in order for a high rate of mass transfer to occur, one of the major requirements is that the surface area offered by the packing elements in the packed bed must be readily accessible to the descending liquid and rising gas. Thus, whereas in comparative beds of saddles, as are for instance described in U.S. Pat. No. 1796501 and U.S. Pat. No. 2639909, the total surface areas are essentially numerically equivalent for comparative sizes of packings, it has been found that mass transfer rates in beds of saddles constructed in accord with U.S. Pat. No. 2639909 are significantly higher, because due to the less symmetrical shape embodied in the saddle element of U.S. Pat. No. 2639909, there is no nesting of pieces. Hence the surface area offered to mass transfer is more readily accessible to liquid and gas contacting. The extent of irregularity of shape which is provided by a tower packing element is thus noted to have an important bearing on the resulting mass transfer efficiency.

Another important requirement for bringing about a high rate of mass transfer is that the packing elements composing the packed bed must comprise such features that are conducive to provide an efficient liquid distribution throughout the packed bed. Thus it has been found that in beds of slotted rings, such as are described in U.S. Pat. No. 3266787, the tongues contained in the interior of the slotted rings are largely ineffective as far as providing an improved internal liquid flow pattern through the packed bed is concerned. This is so because with the tongues all inside of the rings, the tongues are somewhat confined and not sufficiently exposed, therefore do not make any significant contact with adjoining packing pieces in the packed bed.

A significant improvement in internal liquid distribution and hence much better mass transfer was achieved by cutting the slotted rings lengthwise into halves and thus enabling the tongues of one packing element to make effective contact with the surface area and other tongues in neighboring packing elements in the packed bed. Through this simple measure, convenient flow paths have been provided by the tongues, along which the descending liquid can now readily pass from packing element to packing element, rather than fall through the packed bed at random. Thus a much improved state of wetting in the packed bed has been achieved, which has led to a dramatically improved mass transfer efficiency of the packed bed composed of longitudinal halves of slotted rings. The series of experiments demonstrating this important result is presented in a paper which the author has published in the October 1980 issue of VERFAHRENSTECHNIK.

Systematic research done by the author and described in U.S. Pat. No. 4203934 has shown that further important improvements of half-slotted rings will result by ascribing a definite geometry to the individual packing elements, as well as proposing definite designs and arrangements of the tongues.

Besides these two important requirements of a packing element, that is to provide a readily accessible maximum contact surface area, and to bring about an efficient internal liquid distribution, there are a number of other features that should be provided by an efficient packing element. Thus it is important that the packing elements will generate a stable bed configuration, so that the packing pieces will not continue to settle with time, and thus preclude an increase in the vapor or gas phase pressure drop with time.

Another important requirement is that the packing elements in the packed bed should be thoroughly interlocked with each other, so that the downwardly acting weight force of the packed bed is randomly distributed across the tower cross-section. In this way the weight force acting laterally on the tower wall will be minimized. This will also eliminate the danger of crushing of the lowermost packing layers in the bottom of a high packed bed. The ability of adjacent packing elements to interlock will permit the packing elements to be made of thinner gage material which is important as far as the economics of the structure is concerned.

BRIEF SUMMARY OF THE INVENTION

It has now been found surprisingly and entirely unexpectedly that all these properties and features discussed above and which are so very desirable in packing elements and the resulting packed beds, may be achieved with a packing element that possesses the shape of an open-ended bent strip, which comprises three separate curved zones. Moreover, the three separate zones of curvature are interconnected with each other in a continuous way, such that there result two distinct points of inflection, each point of inflection separating two zones of the bent strip, characterized by exhibiting curvatures in two distinctly separate and opposite directions.

Another important feature of the invention is that for best results of mass transfer the physical length, L, as hereinafter defined, should be such that with the prevailing curvatures of the individual zones, interconnected as defined above, the normals to the tangents in regard to the ends of the bent strip should define an angle that varies between zero to about 88 degrees.

Another important requirement of the invention is that the bent strip thus defined should be provided with slots and tongues, which latter point away from the bent strip in a manner to be described more fully hereinafter.

Having thus described the essential features of the invention, and important requirements and objects of the invention, other objects and advantages will become more apparent from the following description taken with the accompanying drawings wherein:

FIG. 1 is a side view which shows the various important main features of the invention;

FIG. 2 shows a modification of FIG. 1 and details of the bent strip of a somewhat different design;

FIG. 3 shows another modification of the geometry of the bent strip;

FIG. 4 shows still another modification of the bent strip;

FIG. 5 shows still another modification of the bent strip;

FIG. 6 shows still a further modification of the bent strip of FIG. 5;

FIG. 7 shows still another modification of the bent strip;

FIG. 8 shows a somewhat different modification of the bent strip;

FIG. 9 shows still another variation of the geometry of the bent strip;

FIG. 10 shows a final variation in the design of the bent strip still in accord with the spirit of the invention;

DETAILED DESCRIPTION

Figure 11:
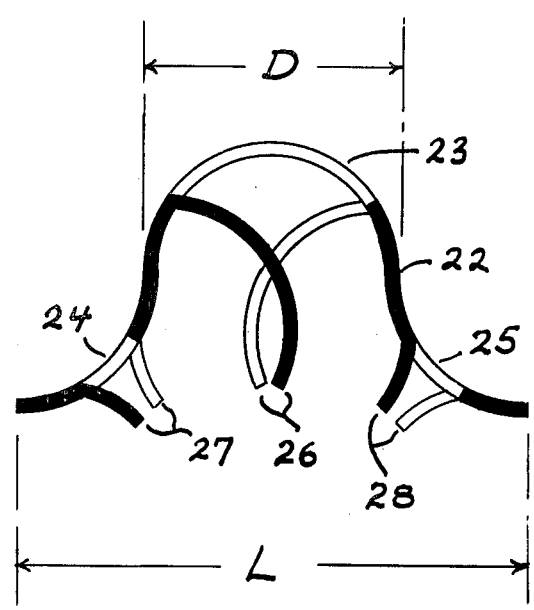
FIG. 11 shows, in section along line 11—11 of FIG. 12, characteristic slot and tongue details.

Referring more particularly to FIG. 1, the three separate zones of the curved strip are denoted by numerals 1, 1a and 1b. Point of inflection $X_1$ separates zone 1a from zone 1, whereas point of inflection $X_2$ separates zone 1b from zone 1. Tangents $T_1$ and $T_2$ pertaining to the ends of the bent strip as defined by length L are indicated, as well as the corresponding normals $N_1$ and $N_2$. It will be seen that for this design, the normals are parallel to each other, which means that the angle between the normals is zero degrees.

FIG. 1 shows three tongues, denoted by I, II and III. It will be noted that all tongues point downwardly. However, since zones 1a and 1b exhibit convex curvatures, when viewed from below, it is seen that tongues I and III point away from the centers $C_1$ and $C_2$ of zones 1a and 1b. As far as zone 1 and depending tongue II are concerned, the reverse is true, and tongue II points in the direction of $C_2$ the center of zone 1. This characteristic arrangement of tongues, in relation to zones from which they depend and the resulting pattern, is an important feature of the invention, as through employment of zones having curvatures in opposite directions and tongues depending from the zones, as shown, a highly unsymmetrical packing element is generated that will lead to a highly randomized packed bed. This was found important in greatly enhancing the bed stability and encourages improved internal liquid distribution, required for optimum mass transfer performance.

It will further be noted that all three tongues I, II and III extend somewhat beyond the lower edge of the packing element. Whereas it is not required that any or all tongues must extend as far down as are shown in FIG. 1, it has generally been found that long tongues will lead to improved mass transfer rates.

In FIGS. 2 to 10, certain variations in the designs of the bent strip are brought forth, all in accord with the spirit of the invention. For purposes of elucidating these features more clearly, tongues and slots, always present in any packing elements discussed here, have been omitted for convenience.

FIG. 2 shows a somewhat wider packing element than FIG. 1, but still clearly within the spirit of the invention. Thus zones 2a and 2 are separated by point of inflection $X_1$, whereas point of inflection $X_2$ separates zones 2 and 2b. It will be noted that the curvatures of zones 2a and 2, as well as 2 and 2b are, as is required by the invention, in opposite directions, respectively. Normals $N_1$ and $N_2$ to tangents $T_1$ and $T_2$ are shown, and it will be noted that angle $\alpha$, defined by intersection of normals $N_1$ and $N_2$, is within the required specifications.

FIG. 3 shows another modification of the bent strip. It will be noted that zones 4a and 4b are appreciably shorter than the corresponding zones in FIGS. 1 and 2. The essential feature is, however, that there are the two points of inflection $X_1$ and $X_2$ separating the three zones from each other. It will be noted that angle $\alpha$ formed by the normals $N_1$ and $N_2$ is within the specifications, and that this angle does actually fix the arcuate lengths of zones 4a and 4b.

FIG. 4, showing another modification of design of the bent strip, embodies a design which adds another measure of non-symmetry to the packing element. Whereas, with FIGS. 1 to 3, the outer zones of curvature were of the same arcuate lengths, this is no longer the case with the following FIGS. 4 to 10. Thus it is found that with these designs the state of randomness of the arrangement of the packing elements in the dumped bed will be even more irregular, with a further improvement in mass transfer performance. It will be noted that FIG. 4 displays the two required points of inflection $X_1$ and $X_2$. The angle $\alpha$ generated by the two normals $N_1$ and $N_2$ is seen to be within the required specifications.

Another highly asymmetric design is shown in FIG. 5. The points of inflection $X_1$ and $X_2$ are seen to separate the three zones of curvature, 8a, 8 and 8b. It may be seen that zone 8b is quite short in comparison with zone 8a. For that reason one may perhaps not have any tongues depending from 8b, or even from the longer end portions, such as 8a.

Shortening the small arcuate zone further with a continued enlargement of the larger zones leads to FIGS. 6 and 7. It will be noted that for all these designs, points of inflection $X_1$ and $X_2$ are provided an angle $\alpha$ generated by normals $N_1$ and $N_2$ becomes progressively smaller as one proceeds from FIGS. 5 to 7.

Whereas in FIGS. 1 to 7, so far discussed, all curved zones had the same radii of curvature and were circular or partly circular, this is not the case with the following FIGS. 8 to 10. Of course, in each of these designs, points of inflection $X_1$ and $X_2$ are provided and although not shown, the angle α generated by the normals is within the specifications. It is noted that in FIG. 8, the bent strip consists of three separate circular zones wherein zone 13 has the largest radius of curvature, with zone 14 having an intermediate radius of curvature and zone 15 having the smallest radius of curvature. With FIG. 9, the situation is such that all zones are circular with radii of curvature decreasing as one proceeds from zone 16 to zone 18. The design shown in FIG. 10 is similar to that in FIG. 8. However, whereas zones 19 and 21 are circular, zone 20 is parabolic. It is, of course, understood that any other readily described curve may be used to make any or all of the three zones of the invention.

Although it is most frequent that the three zones are circular, the heterogeneous use of zones of various curvature and character will add further to render the packing element less symmetrical, and thereby increase the randomness of the packed bed and improve the resulting bed stability and mass transfer.

Having thus defined the various designs which may be embodied in the bent strip comprising an important part of the invention, it has been found that the design of the tongues and other features have an important effect on the resulting mass transfer.

Figure 12:
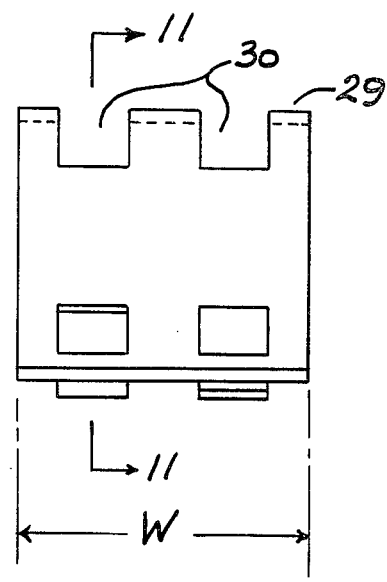
FIG. 12 is a side elevation of FIG. 11 showing further details of the invention.

Thus FIG. 11 is a sectional view taken along line 11—11 of FIG. 12 of a typical packing element. The expanse of the bent strip is denoted by numeral 22, and it is clearly apparent that there are two points of inflection, as are required by the invention. The bent strip is provided with slots 23, 24 and 25. Depending from the slots are tongues 26, 27 and 28. It will be noted that the tongues are bent and are all of the same arcuate lengths as the slots from which they depend. This being the case, the slots and tongues have been formed integrally by one and the same operation. Such a process is usually employed when working with metals, and the material composing the tongues was originally contained in the slots prior to formation of the tongues.

As will be seen, the diameter of the central curved zone is indicated by D, whereas the total length of the packing element is given by L. It will be noted that in the design shown in FIG. 11, the ratio of L/D is equal to two. Normally the peripheral tongues 27 and 28, being smaller than the central tongues 26, one would expect the peripheral tongues 27 and 28 to occupy an inferior role in the process of gas-liquid contacting. However, by virtue of an adequate choice of length L, it becomes possible to expose the smaller tongues 27 and 28 more effectively and thus render them more effective than would be the case with a lesser value of L. The importance of the small tongues 27 and 28 is enhanced further because they depend away from surfaces which are convex rather than concave. By virtue of the tongues 27 and 28 depending away from a convex rather than concave surface, the functional merits of the smaller peripheral tongues have been upgraded in an important manner, resulting in important improvements in mass transfer. Taking all this into account, it was learned that the ratio of L/D assumes critical importance. Thus with the design of FIG. 11, L/D may vary between 3 to as low as 1.20. For best results, the ratio of L/D should vary between 2.5 and 1.4.

FIG. 12 shows a side elevation of FIG. 11. The bent strip is denoted by numeral 29 and the slots are identified by 30. Two rows of slots are provided with tongues progressing in reverse direction, as shown in FIG. 11. The width of the packing element of FIG. 12 is indicated by W. Generally speaking, the width of the element is determined to an important extent by the number of rows of slots which are contained in parallel in the element. However, it is important that the width will not be too narrow as otherwise undesirable arrangements of the packing elements in the packed bed will result. Thus the ratio of L/W can vary from 0.5 to 4.0. For best results, however, it was found that the ratio should be between 0.75 and 3.0.

Figure 13:
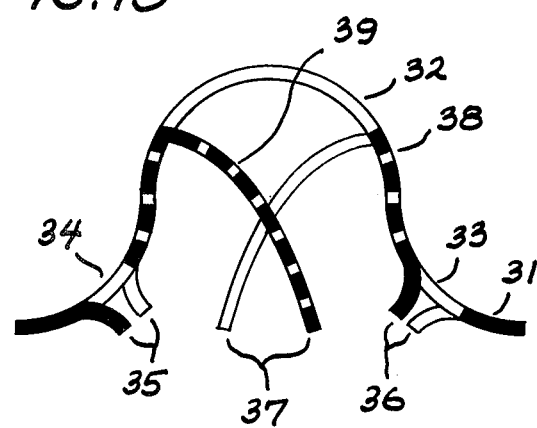
FIG. 13 shows further details of slots and tongues which Figure is an elevation in section along line 13—13 of FIG. 14.
Figure 14:
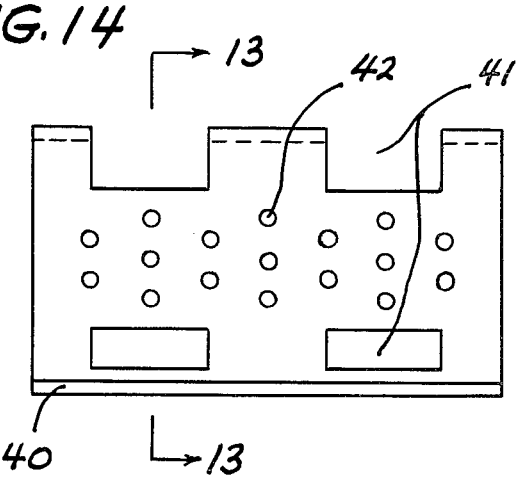
FIG. 14 is another side elevation of a typical packing element showing further details embodied in the invention.

FIG. 13 is a sectional view of another typical packing element as viewed along line 13—13 of FIG. 14. The bent strip is denoted by numeral 31 and the slots in the strip by numerals 32, 33 and 34. Tongues 35 and 36, depending from the small slots 33 and 34, are essentially of the same arcuate length as the depending slots. However, tongues 37, depending from the central larger slots, are seen to be longer arcuately than the arcuate lengths of slots 33. The material composing these tongues 37 was therefore not originally contained in the slots before forming.

It will also be noted that both the bent strip 31 as well as tongues 37 are provided with small diameter holes 38 and 39, respectively. Provision of such holes or perforations is frequently an important requirement, especially when the packings are used in applications that call for elevated liquid irrigation rates. In such instances, provision of such holes as indicated will yield higher mass transfer rates for two important reasons. Firstly because provision of holes 38 and 39 will encourage a faster run-off of liquid away from the packing surface and tongues, the liquid hold-up in the column is reduced and secondly, by passing the liquid downwardly by way of the many small streamlets which will result from these perforations, additional contacting surface between gas and liquid is generated. Both features will have beneficial effects as far as improvement of mass transfer rates are concerned. Finally, provision of such holes in conjunction with the very long tongues as are contained in the packing elements becomes especially desirable as otherwise stagnant liquid pools may form which would have additional adverse effects on mass transfer.

FIG. 14 shows a side elevation of the packing element shown in section in FIG. 13. The bent strip is denoted by numeral 40, looking on the bent strip edgewise. Slots are indicated by numeral 41 and the holes, perforating the bent strip are indicated by numeral 42. These holes or perforations are in most cases circular. However, it would be in the spirit of the invention to provide holes of other geometric shapes as well. The diameters of these holes may become of importance. In most cases they are, however, envisioned as relatively small, say of a few millimeters in diameter, in order to be effective for diverting the liquid away in the form of small streamlets.

Figure 15:
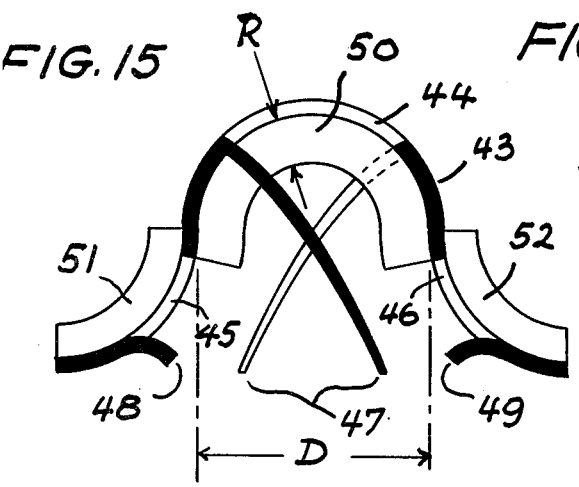
FIG. 15 is another sectional elevation showing further construction details.

FIG. 15 shows another design of the packing element. The bent strip is denoted by numeral 43, and three relatively large slots are denoted by numerals 44, 45 and 46. It will be seen that tongues 47 depending from slots 44 are actually longer than the arcuate lengths of slots 44, whereas tongues 48 and 49 are arcuately smaller than the corresponding slots 45 and 46. It is also indicated that tongues 47 are downwardly tapered. The packing element described in FIG. 15 contains also strengthening rib 50, extending inwardly, as well as strengthening ribs 51 and 52, extending outwardly. For best results it has been found that the depth of the strengthening ribs, as denoted by letter "R", should not be less than one sixth of the largest expanse of a rib, as denoted by letter "D".

The packing element described in FIG. 15 is a modification of that shown in FIG. 13 and is most conveniently made of plastics, using the normal methods of injection molding or similar techniques. Although not indicated, a piece of the design of FIG. 15 would preferably be equipped with a multitude of relatively small diameter holes as has already been described in connection with FIGS. 13 and 14, to minimize liquid hold-up and enhance mass transfer efficiency.

Figure 16:
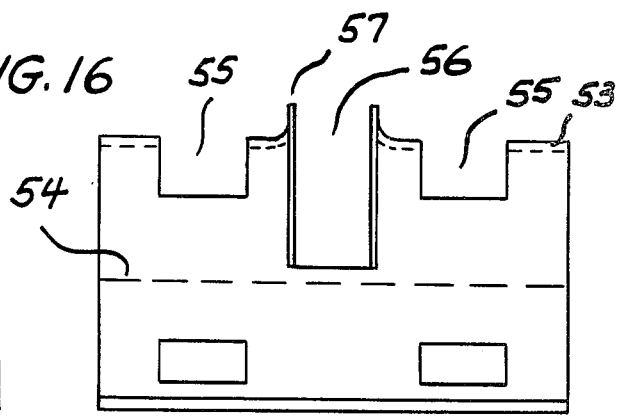
FIG. 16 shows another side elevation of a typical form of the invention.

FIG. 16 shows a final design of a packing element. The bent strip is denoted by numeral 53 and the line along which the points of inflection progress is indicated by numeral 54. Two parallel rows of slots denoted by numerals 55 are indicated, from which tongues (not shown) depend.

The element described in FIG. 16 contains an additional feature, namely cut-out 56, generated by the upturned edges 57 of a central portion of the bent strip. Provision of such a cut-out was found to have a significant effect on the performance of the packing by both increasing the capacity of the packed bed to handle larger quantities of gases and liquids, as well as by improving additional randomness in the bed and improved mass transfer. The central cut-out 56 would normally extend around the central curved zone of the packing element only and down to about the line which defines the points of inflection.

A packing element of the design shown in FIG. 16 may, of course, also be equipped with small diameter holes or perforations, both in the bent strip as well as in the tongues. The design can be made readily of metals, as well as plastics through the normal methods of injection molding.

While the tongues when struck out from slots, such as shown in FIG. 11, are of the same material as the packing element, particularly when molded of plastic material, in other instances they may be of a different material, also they may be longer or shorter than the slots from which they emerge.

Thus it will be seen that I have provided an efficient packing element for a packing bed for vapor or gas-liquid contacting tower that will increase mass transfer efficiency and physical stability of the bed.

While I have illustrated and described several embodiments of my invention, it will be understood that these are by way of illustration only and that various changes and modifications may be contemplated in my invention and within the scope of the following claims.

I claim:

1. In a packing for a gas-liquid contacting tower and the like, a plurality of randomly packed mutually interlocking packing elements providing a bed, each packing element comprising an intermediate portion curved concavely, and end portions curved convexly, slot means formed in said packing element in both said intermediate and end portions, first tongue means depending from said slot means in said concavely-curved intermediate portion and extending away only inwardly from said intermediate portion and second tongue means depending from said slot means in said convexly-curved end portions and extending away from said end portions in only the same general direction from said packing element as said first tongue means.

2. In a tower packing as recited in claim 1 wherein lines perpendicular to the tangents at the ends of said packing element define an angle of between zero and about 88 degrees.

3. In a tower packing as recited in claim 1 wherein the curvatures of said intermediate and end portions are non-circular.

4. In a packing element as recited in claim 1 wherein said end portions are of different lengths.

5. In a tower as recited in claim 1 wherein said intermediate portion is perforated.

6. In a tower packing as recited in claim 1 wherein at least some of said tongues are arcuate and extend beyond a line joining the extremities of said end portions and wherein at least one of said tongues is perforated.

7. In a tower packing as recited in claim 1 wherein reinforcing ribs are formed on said intermediate and end portions.

8. In a tower packing as recited in claim 1 wherein said tongues of said intermediate portion are arcuate and tapered downwardly and inwardly in a direction away from the concave surface of said intermediate portion and extend approximately to a line joining the extremities of said end portions.

9. In a tower packing, as in claim 1 wherein said tongue means in the intermediate portion extend all centrally inwardly and all of the same length.

10. In a tower packing as recited in claim 1 wherein said intermediate and end portions are circular and exhibit all the same radii of curvature.

11. In a tower packing as in claim 1 wherein the ratio of the length of the packing element to the diameter of the intermediate portion varies from 3 to 1.2.

12. In a tower packing as in claim 1 wherein the intermediate portion extends essentially through an arc of 180°.

13. In a tower packing as in claim 1 wherein said tongue means extend beyond a line interconnecting the extremities of said end portions.

* * * * *